United States Patent [19]

Bassier et al.

[11] 4,445,937

[45] May 1, 1984

[54] PNEUMATIC STOWING OF CONSTRUCTION MATERIAL COMPRISING CALCIUM ALPHA- AND BETA-SULPHATE HEMIHYDRATES

[75] Inventors: Friedr. Bassier, Duisburg; Fritz Adrian, Ratingen; Dieter Deuster, Hilden, all of Fed. Rep. of Germany

[73] Assignees: Ruhrkohle AG; Steag AG, both of Essen, Fed. Rep. of Germany

[21] Appl. No.: 303,463

[22] Filed: Sep. 18, 1981

[51] Int. Cl.$^3$ ............................................. C04B 11/10
[52] U.S. Cl. .................................... 106/109; 106/110; 106/DIG. 1
[58] Field of Search ................ 106/109, 110, DIG. 1

[56] References Cited

U.S. PATENT DOCUMENTS

| | | | |
|---|---|---|---|
| 2,083,321 | 6/1937 | Dunn et al. | 106/109 |
| 2,508,600 | 5/1950 | Fitzsimmons | 106/109 |
| 2,785,988 | 3/1957 | Lipkind et al. | 106/109 |
| 3,623,898 | 11/1971 | Limberis | 106/109 |
| 4,286,994 | 9/1981 | Muller et al. | 106/110 |

Primary Examiner—James Poer
Attorney, Agent, or Firm—Jon M. Lewis

[57] ABSTRACT

An improved method for pneumatic stowing of calcium alpha-sulphate hemihydrate, calcium beta-sulphate hemihydrate or mixtures thereof using natural anhydrite, limestone or mixtures thereof is disclosed. In addition, construction reinforcement compositions comprising said hemihydrates and natural anhydrite, limestone or mixtures thereof are taught.

14 Claims, No Drawings

PNEUMATIC STOWING OF CONSTRUCTION MATERIAL COMPRISING CALCIUM ALPHA- AND BETA-SULPHATE HEMIHYDRATES

SUMMARY OF THE INVENTION

The invention relates to an improved method for pneumatic stowing of a construction reinforcement material which comprises calcium alpha-sulphate hemihydrate, calcium beta-sulphate hemihydrate or mixtures thereof, by incorporating natural anhydrite (natural form of anhydrous calcium sulphate), limestone or mixtures thereof to increase the flowability of the material. The invention also relates to underground tunnel construction reinforcement compositions comprising calcium alpha-sulphate hemihydrate, calcium beta-sulphate hemihydrate or mixtures thereof and natural anhydrite, limestone or mixtures thereof. Said compositions may also contain flue dust which tends to improve the properties of the ultimately formed tunnel reinforcement materials, especially when the calcium alpha-sulphate hemihydrate is present.

BACKGROUND OF THE INVENTION

Industry has long attempted to make use of the bi-products of its basic processes. More recently, greater concern has been shown as to the effect of by-products of many processes being introduced into the environment. The foregoing has been especially true as applied to power generation operations, the most significant of such being coal-fired power stations. The waste gases produced by power stations, especially coal-fired power stations, are washed with the primary objective being the removal of sulphur. Generally, sulphur is removed by absorption using limestone ($CaCO_3$) or lime in oxide (CaO) or hydroxide $Ca(OH)_2$ form. The residues from these processes contain separated sulphur dioxide ($SO_2$) primarily in the form of calcium sulphite ($CaSO_3.xH_2O$). The sulphite accumulates in suspensions or slurries and may also contain dust if the lime or limestone which simultaneously serves to remove dust and $SO_2$ is added to the wash-separator. The calcium sulphite can however also exist relatively dust-free, if electrostatic filters are used before the washing. The residues exist in relatively large amounts and are difficult to handle, owing to their consistency and to their chemical properties. In particular there are considerable difficulties associated with disposal and use of the residue. The residues are worked up either to yield materials termed calcium alpha-sulphate hemihydrate or calcium beta-sulphate hemihydrate. In detail, an aqueous solution obtained in a wash of the combustion gases, which has absorbed the sulphur dioxide contained in gases of combustion, is the starting material. By using lime in the wash, $CaSO_4 x 2H_2O$ (calcium sulphate dihydrate) is obtained. The residues which are thus obtained from the lime wash are oxidized with air in a vessel. The treated residues are transferred to a thickener. Lime sludge $CaSO_4 x 2H_2O$ (calcium sulphate dihydrate) is obtained from the thickener. If the thus-obtained crude gypsum is passed to a drying apparatus, calcium beta-sulphate hemihydrate is obtained by calcination.

In order to obtain calcium alpha-sulphate hemihydrate, water is added to the crude gypsum in a mixer. The thus-obtained crude gypsum-aqueous sludge is pumped continuously into an autoclave and recrystallised into calcium alpha-sulphate hemihydrate gypsum under controlled conditions (temperature less than 150° C.). Additives for control of the pH value and for alteration of the crystallisation crop of the alpha-sulphate hemihydrate can be introduced into the autoclave and facilitate the production of alpha-sulphate hemihydrate, with varying properties, as the end product. This alpha-sulphate hemihydrate is continuously drawn off from the aqueous phase in a centrifuge. On drying, e.g. in a circulating drier, powdered calcium alpha-sulphate hemihydrate ($CaSO_4.\frac{1}{2}H_2O$) is obtained.

Both products, calcium alpha-sulphate hemihydrate and calcium beta-sulphate hemihydrate, are suitable for use as underground tunnel reinforcement material on account of their setting capability and strength. Owing to its lower strength, the beta-sulphate hemihydrate is of relatively restricted utility, particularly in back filling. Relatively high hardness and brittleness of alpha-sulphate hemihydrate, in its pure form, must be taken into account while using it as a construction material. These properties allow only limited utility for alpha-sulphate hemihydrate, but it has been found that alpha-sulphate hemihydrate with added flue dust from coal-burning plants as an impurity imparts the desired flexibility and thereby allows the wide use of alpha-sulphate hemihydrate as a building material for underground tunnel reinforcement. (In addition, these materials can be used within the construction industry and in many other areas where a reinforcing material is desired, especially where case-hardening underground materials are needed, such as building foundations, dams, etc.)

The flue dust employed to modify the properties of the sulphate hemihydrate can vary considerably in composition dependent upon the material being burned, the temperature employed, etc. However, the primary components of dust obtained from mineral coal are:

$SiO_2$ 45–55% by weight  CaO 2–7%
$Al_2O_3$ 23–35% by weight  $K_2O$ 3–5%
$Fe_2O_3$ 3–10% by weight  MgO 1–3%

Generally, the range of the ratio of sulphate hemihydrate to flue dust is 40–100 percent by weight to 60–0 percent by weight, respectively. A narrower range of 8–12% by weight of flue dust is desirable in certain applications.

The use of construction materials requires numerous transfers, and has associated handling problems. The large quantities of materials used and low costs required per unit quantity purchased have caused great attention to be directed to improving methods for transferring these materials. In the case of semi-solid flowable construction materials, a very desirable method for transporting these materials utilizes the concept of pneumatic stowing or conveying. This approach involves either the use of air under pressure to push materials from one point to another or vacuum systems to draw material from one point to another. Various prior art arrangements and systems for pneumatic stowing of construction materials are known to those who are skilled in the art; such prior art arrangements are not crucial to the present invention and are not dealt with herein. Thus, for the underground use of calcium alpha-sulphate hemihydrate and/or calcium beta-sulphate hemihydrate as a semi-solid construction material, pure or mixed with flue dust, and also for the use of this building material above ground, pneumatic stowing may be resorted to with advantages. The pulverised construction material comprising hemihydrates is generally conveyed pneumatically from a silo to the casing station and diluted as desired by the addition of a large amount of water when pneumatic stowing is used.

It has been found that in the pneumatic stowing of pure calcium alpha-sulphate hemihydrate or calcium beta-sulphate hemihydrate, blockages are formed if the pneumatic stowing is conducted over a long stretch. In addition, this problem occurs widely if the calcium alpha-sulphate hemihydrate and/or calcium beta-sulphate hemihydrate is mixed with flue dust, i.e. when a mixture of calcium alpha-sulphate hemihydrate and/or calcium beta-sulphate hemihydrate with flue dust is used as the constructional material which is pneumatically stowed. Lastly, the mixture with flue dust in addition to having occasional operation interruptions which are caused by non-uniform batch mixtures, one occasionally observes at evenly recurring intervals, flue dust escaping to an increasing degree. According to the invention, a considerable proportion of flue dust is led back into the sulphate hemihydrate powder stream, which appears in an apparently unobvious form, perceptible solely from the varying volumetric concentrations.

It is highly desirable to provide a manner of overcoming the blockages of pneumatically stowed construction material, especially when the construction material contains flue dust.

This invention has as its object the elimination of the blockages of pure calcium alpha-sulphate hemihydrate and/or calcium beta-sulphate hemihydrate as well as the interruptions in operation during pneumatic stowing of such construction materials with additions of flue dust. According to the invention, this is achieved by addition of large-grained natural form of anhydrous calcium sulphate (natural anhydrite) and/or limestone. Calcium alpha-sulphate hemihydrate or calcium beta-sulphate hemihydrate is thereby no longer in pure form but mixed with predetermined quantities of natural anhydrite or limestone or provided.

According to the invention, advantage is taken of the fact that added natural anhydrite or limestone does not react with the water added in the pneumatic stowing. The added water is bound to the calcium alpha-sulphate hemihydrate and/or calcium beta-sulphate hemihydrate, before natural anhydrite and limestone can react. This also applies in the case when the natural anhydrite is mixed with sulphates as reaction accelerators, such as $FeSO_4$. The large particles of the additive according to the invention cause a composition behavior which allows considerably greater transport stretches in contrast to the pneumatic stowing of pure calcium alpha-sulphate hemihydrate and/or calcium beta-sulphate hemihydrate; the additive promotes an even distribution of the flue dust in the calcium alpha-sulphate hemihydrate and/or calcium beta-sulphate hemihydrate, thereby obviating blockages in pneumatic stowing.

For introduction into underground tunnel reinforcement or for similar uses, the addition of natural anhydrite and/or limestone is preferably in the range of 8–22% of the total introduced mixture, on a weight basis. Greater added amounts reduce the strength of, e.g. roadside packs, to an undesirable degree. Amounts of additive lying below, about 8% by weight, are not effective enough in increasing the transport mobility or flowability of the construction mixture.

A preferred percentage range for the natural anhydrite and/or limestone is from about 10 percent to about 12 percent on a weight basis.

In a preferred composition according to the invention, the tunnel construction reinforcement material would contain approximately 92 to 78 parts by weight of calcium alpha-sulphate hemihydrate and/or calcium beta-sulphate hemihydrate to about 8 to 22 parts by weight of natural anhydrite and/or limestone.

Two examples of construction material compositions including limestone anhydrites according to the invention are:
(i) 60% by weight of hemihydrate, 30% flue dust and 10% limestone anhydrite
(ii) 44% by weight of hemihydrate, 44% flue dust and 12% limestone anhydrite.

A preferred composition for underground tunnel construction material comprising flue dust and natural calcium anhydrites for improving material flowability would be 60% by weight of alpha-sulphate hemihydrate, 30% by weight of flue dust and 10% by weight of natural calcium anhydrites.

Since the present invention is directed to construction materials, the degree of purity need not be that of fine chemicals or pharmaceuticals. This is in part due to the nature of the product and prohibitive costs of purification. In view of this, one may find small amounts of impurities present in the foregoing construction materials which one would associate with the source that the material was obtained from.

Natural anhydrite (natural gypsum) and limestone can be obtained from open quarries or underground quarries. The rock is preferably blown and accumulates in large lumps. The accumulated lumps are first coarsely divided, then divided to a medium size and, in conventional quarry plants, further divided more finely, e.g., in the range of 5 to 13 mm. Impact breakers, jaw breakers, roll breakers with filter and feedback are suitable for the coarse division; rebound crushers or roll crushers are suitable for the medium or coarse division. For broken limestone in the size range of 7 to 13 mm, for example, coarse grains, further fine division is no longer necessary. The addition of natural anhydrite or limestone according to the invention is advantageously conducted before emptying the construction material into the silos at the casing station point. If necessary, in order to prevent dissociation during transport to the casing station or during filling into the silos or transport container, the natural anhydrite and the limestone are wetted with water and subsequently dusted with sulphate before mixing with the alpha-sulphate hemihydrate or the beta-sulphate hemihydrate and the flue dust. As a result of the wetting with water and subsequent dusting, coarse grains with furry outer surfaces, the skin of which is composed of sulphate hemihydrate dust, are obtained. Such dusted coarse grains possess strong inertia in each mixing, so that dissociation is precluded.

The extent of water addition needed for the invention will vary with the requirements and special considerations of each construction mixture. It is also found expedient to control the amount of water used depending on whether the material comprises alpha hemihydrate or beta hemihydrate.

Two preferred examples of differing added water content for alpha hemihydrate and beta hemihydrate mixtures are given below:
(1) 25 grms of water per 100 grms of dry mixture containing
45% alpha hemihydrate
45% flue dust and 10% limestone, by weight
(2) 40 grms of water per 100 grms of dry mixture containing
45% beta hemihydrate
45% flue dust and
10% limestone, by weight The particulate size of alpha-sulphate hemihydrate and beta-sulphate hemihydrate is not very crucial to this invention. However, it is preferred to have hemihydrate particles less than about 0.63 mm in size; it is advantageous to have about 10% of the hemihydrate particles by weight larger than 0.09 mm.

Likewise, even though the particulate size of the flue dust used in the invention is not very critical, it is preferred that the flue dust particles should generally be under 1 mm in size. Advantageously, 15% by weight of the total flue dust used should be larger than 0.09 mm in size.

What is claimed is:

1. In a process of pneumatic stowing of flowable construction material which selectively includes predetermined amounts of calcium alpha-sulphate hemihydrate, calcium beta-sulphate hemihydrate in predetermined proportions by weight, the improvement comprising mixing a known amount of additive to said construction material to increase material flowability, the additive comprising anhydrous calcium sulphate or limestone or a mixture of both in their natural form.

2. The process of pneumatic stowing of flowable construction material which is in a semi-solid form, as in claim 1, wherein the improvement comprises a method step of adding predetermined quantity of water to the construction material.

3. The process as in claim 1 wherein the improvement comprises the step of mixing predetermined quantities of water to the additive anhydrous calcium sulphate before mixing the additive to the construction material.

4. The process as in claim 3 wherein the improvement comprises the step of dusting said additive with a sulphate before mixing the additive to the construction material.

5. The process as in claim 1 wherein the improvement consists in that the step of mixing the additive comprises mixing between 8 to 22% by weight of natural limestone.

6. The process as in claim 5 wherein the improvement comprises the step of adding a predetermined quantity of flue dust particles to the construction material.

7. The process as in claim 6, wherein the improvement comprises the step of controlling the particulate size of the additive material to be within 7 to 13 mm.

8. The process as in claim 6, wherein the improvement comprises the step of maintaining the % b weight ratio of sulphate hemihydrate to flue dust to natural calcium sulphate equal to 6:3:1.

9. In a process of pneumatic stowing of semi-solid construction material which selectively includes predetermined amounts of calcium alpha-sulphate hemihydrate and calcium beta-sulphate hemidrate and an optional content of flue dust in a predetermined proportion by weight, the method step of increasing the flowability of the constructional material during pneumatic stowing, wherein the improvement comprises the method step comprising mixing an additive in the form of a predetermined weight percentage of anhydrous calcium sulphate or limestone or a mixture of the two, in natural form.

10. The process as in claim 9, wherein the improvement comprises the step of pre-wetting the additive and dusting the additive with sulphate before mixing the additive with the constructional material.

11. A construction material for underground tunnel construction, comprising 60% by weight selected from calcium alpha-sulphate hemihydrate and calcium beta-sulphate hemihydrate, 30% by weight of flue dust obtained burning mineral coal, and 10% by weight of an additive selected from natural forms of coarse grained anhydrous calcium sulphate, limestone or a mixture thereof.

12. A construction material as in claim 11, wherein said additive is prewashed with water and dusted with a sulphate before mixing with said hemihydrates.

13. A construction reinforcement material which can cure and set, for underground tunnel construction comprising 45% by weight of material selected from calcium alpha-sulphate hemihydrate and calcium beta-sulphate hemihydrate, 45% by weight of flue dust obtained from coal burning, and 10% by weight of natural coarse grained limestone or anhydrous calcium sulphate.

14. In a method of conveying flowable construction material by pneumatic stowing in a conduit, the material selectively including calcium alpha-sulphate hemihydrate and calcium beta-sulphate hemihydrate in predetermined weight proportions, the improvement comprising:
imparting flexibility to the construction material by adding predetermined quantities of flue dust such as from coal-burning plants, and
increasing material flowability of said construction material by adding a predetermined quantity of coarse grained limestone in its natural form to said construction material during pneumatic stowing.

* * * * *